(12) United States Patent
Nagpal et al.

(10) Patent No.: US 11,540,092 B1
(45) Date of Patent: Dec. 27, 2022

(54) SYSTEMS AND METHODS FOR ANALYZING AND OPTIMIZING CONFERENCE EXPERIENCES

(71) Applicant: Verizon Patent and Licensing Inc., Basking Ridge, NJ (US)

(72) Inventors: Tarun Nagpal, Bengaluru (IN); Harish Narayan Viswanathan, Bangalore (IN); Krish Ramakrishnan, Saratoga, CA (US); Alagu Periyannan, Palo Alto, CA (US); Peter Anton Verwayen, El Dorado Hills, CA (US); Mahabaleshwar Bhat, Cupertino, CA (US); Pradeep Malhotra, Bangalore (IN); Ashish Nagpal, Bangalore (IN); Karthick Kaliannan Neelamohan, Namakkal District (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/498,923

(22) Filed: Oct. 12, 2021

(51) Int. Cl.
*H04W 4/16* (2009.01)
*H04M 3/56* (2006.01)

(52) U.S. Cl.
CPC .............. *H04W 4/16* (2013.01); *H04M 3/56* (2013.01)

(58) Field of Classification Search
CPC ............ H04N 1/42; H04N 7/14; H04N 7/141; H04N 7/15; H04N 7/157; H04N 2007/145; H04M 1/72519; H04M 3/56; H04M 2207/18; H04M 2250/62

USPC ......................................................... 455/416
See application file for complete search history.

(56) References Cited

U.S. PATENT DOCUMENTS

| | | | |
|---|---|---|---|
| 9,264,320 B1* | 2/2016 | Shevenell | H04L 47/6235 |
| 10,264,214 B1* | 4/2019 | Kumar | H04N 7/157 |
| 2014/0219088 A1* | 8/2014 | Oyman | H04N 21/23439 370/231 |
| 2016/0328988 A1* | 11/2016 | Gil | G06Q 10/10 |
| 2019/0050774 A1* | 2/2019 | Divine | G16H 50/20 |
| 2019/0349212 A1* | 11/2019 | Heins | H04L 12/1831 |
| 2020/0234251 A1* | 7/2020 | Ma | G05B 23/0218 |
| 2021/0281686 A1* | 9/2021 | Schüldt | H04L 12/1827 |
| 2022/0086393 A1* | 3/2022 | Peters | G06V 20/41 |
| 2022/0261758 A1* | 8/2022 | Kim | G06Q 10/06398 |

* cited by examiner

*Primary Examiner* — Maria El-Zoobi

(57) ABSTRACT

Disclosed is a system for analyzing and optimizing conference experiences. The system may identify parameters associated with a conference between a set of User Equipment ("UEs") used by different conference participants to access the conference. The system may compare the identified parameters to sets of parameters associated with a classification model. The system may identify, based on the comparing and the model output, a particular classification for the conference, and may calculate an impact of each conference parameter on the particular classification based on a particular parameter combination included in the model for the particular classification. The system may determine that a subset of the conference parameters has a larger impact on the particular classification than other conference parameters, may select one or more actions that are associated with the particular classification and the subset of parameters, and may perform the one or more actions.

20 Claims, 13 Drawing Sheets

700

| Meeting ID: | Start Time: | End Time: | Duration | Feedback | Score |
|---|---|---|---|---|---|
| 65418947 | 12:23 4/1/2020 | 12:23 4/1/2020 | 0 | 0 | ● 4.8 |
| 64324681 | 14:00 4/2/2020 | 15:00 4/2/2020 | 60 | 0 | ◎ 3.5 |
| 65413281 | 4:30 4/2/2020 | 4:59 4/2/2020 | 29 | 1 | ● 4.9 |
| 98847651 | 13:00 4/2/2020 | 13:05 4/2/2020 | 5 | 0 | ○ 1.8 |
| 67984312 | 18:25 4/2/2020 | 19:05 4/2/2020 | 40 | 0 | ◎ 3.8 |
| 51654102 | 14:00 4/3/2020 | 15:00 4/3/2020 | 60 | 0 | ● 4.1 |
| 65436210 | 14:00 4/3/2020 | 14:40 4/3/2020 | 40 | 2 | ○ 2.3 |
| 65436201 | 14:30 4/3/2020 | 15:02 4/3/2020 | 32 | 1 | ◎ 3.7 |
| 54513200 | 16:00 4/4/2020 | 16:35 4/4/2020 | 35 | 0 | ● 4.7 |
| 65498413 | 16:10 4/4/2020 | 16:45 4/4/2020 | 30 | 0 | 4.5 |

SYSTEMS AND METHODS FOR ANALYZING AND OPTIMIZING CONFERENCE EXPERIENCES

BACKGROUND

Audio and video conference tools may facilitate collaborations between remotely located employees of a business, employees of different businesses, social conversations, and/or other remote interactions. The experience for different users, at different times, from different locations, and/or for different conferences may differ for a variety of reasons. For instance, software incompatibility and network reliability issues may result in different conference participants experiencing some of the same issues (e.g., repeated disconnects, delayed video, etc.) albeit for different reasons.

BRIEF DESCRIPTION OF THE DRAWINGS

FIG. 7 illustrates an example user interface ("UI") for presenting an experience score for different conferences in accordance with some embodiments presented herein;

DETAILED DESCRIPTION OF EXAMPLE EMBODIMENTS

Figure 1:
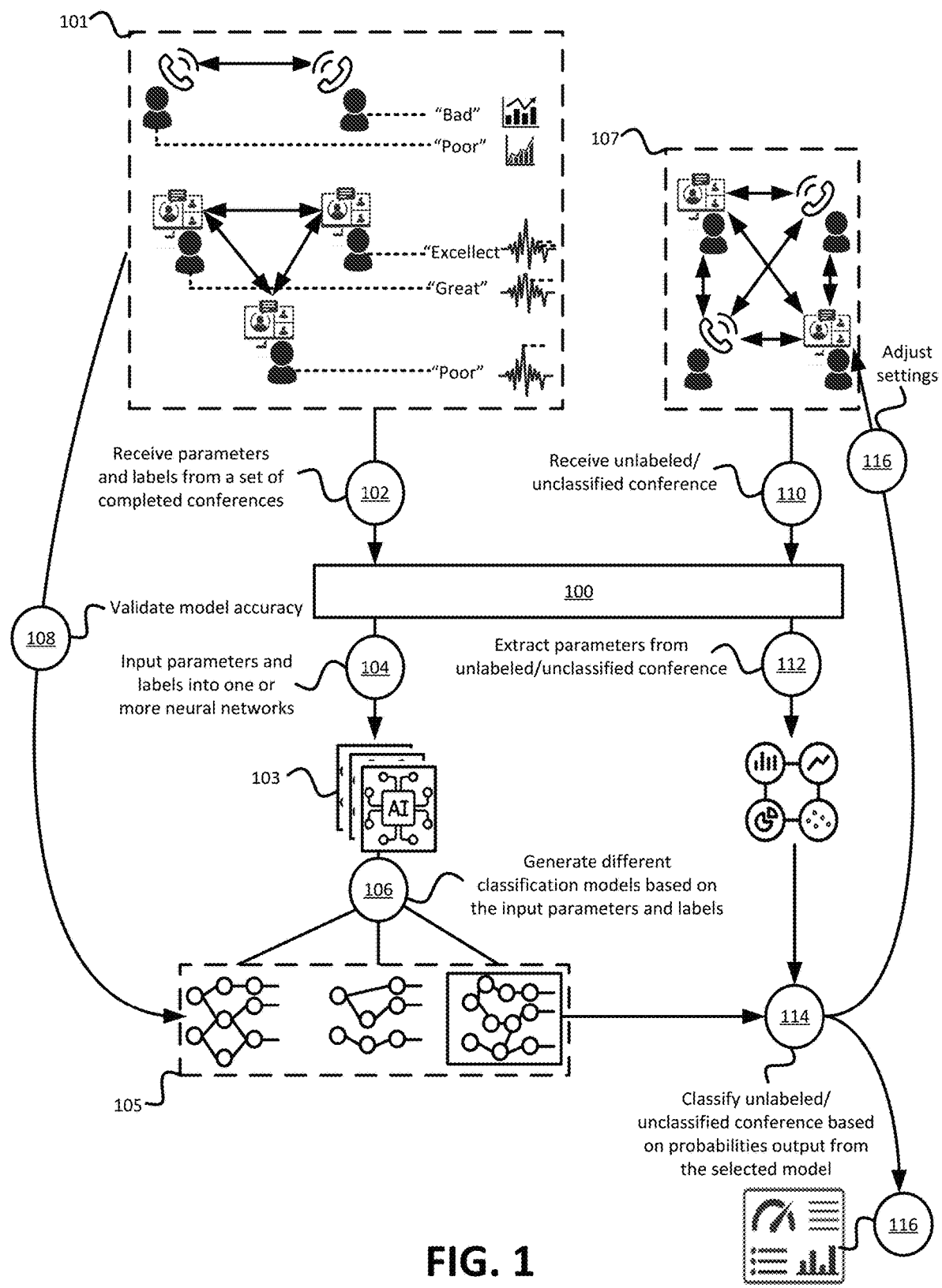
FIG. 1 illustrates an example of modeling different conference experiences in order to optimize subsequent unclassified conferences in accordance with some embodiments presented herein.

The following detailed description refers to the accompanying drawings. The same reference numbers in different drawings may identify the same or similar elements.

Embodiments described herein provide systems and methods for analyzing and optimizing conference experiences using artificial intelligence and/or machine learning ("AI/ML") techniques or other suitable techniques. In some embodiments, a conference monitoring system may use such techniques to generate a model based on parameters of completed conferences and one or more experience labels and/or classifications that are associated with the completed conferences. The parameters may include different metrics, features, and/or conference attributes that may be tracked by the conference monitoring system without referencing the actual conference content. In this manner, privacy and confidentiality of conference participants may be maintained.

An experience label and/or classification, as referred to herein, may include an annotation by one or more participants of a completed conference that indicates whether the one or more participants had a positive conference experience, a negative conference experience, or various experience gradations. In some embodiments, the experience label may include an identifier (e.g., "great", "poor", "bad", etc.), a rating within a specified range (e.g., a numerical value between 0-5, a score between 1-100, etc.), and/or some other suitable value, indicator, score, or the like. Generating the model may include determining probabilities with which different parameter combinations from the completed conferences are present within different groups of the completed conferences that are associated with a different experience label.

The conference monitoring system may generate and/or identify parameters associated with a given conference, and may provide the generated parameters as inputs to the model. The model may output a vector that includes different probabilities for classifying the conference, based on the parameters, with different experience labels or classifications associated with (e.g., learned from, in accordance with one or more suitable AI/ML techniques) a labeled and/or classified set of completed conferences. In some embodiments, the model may set the different probabilities based on the number of parameters from the unlabeled and/or unclassified conference and an impact that those parameters are modeled to have with respect to the different experience labels and/or classifications.

Based on the resulting classification provided by the model, the conference monitoring system may implement various actions to optimize an ongoing conference experience, future conferences (e.g., that involve one or more conference participants from the newly classified conference and/or different conference participants), or conferences with the same or similar parameters. The various actions may include adjusting audio, video, and/or other settings of the conference (e.g., bitrate, resolution, activating or deactivating video, adjusting volume of individual conference participants, etc.), providing parameterized diagnostics for identifying different root causes to a particular negative or suboptimal experience, and/or generating various interfaces or notifications for controlling the conference experience across an enterprise, a conference platform, and/or individual user devices.

FIG. 1 illustrates an example of modeling different conference experiences in order to optimize subsequent unclassified conferences in accordance with some embodiments presented herein. As shown in FIG. 1, conference monitoring system 100 may receive (at 102) a set of labeled conferences 101. Each labeled conference 101 may include a set of parameters and an experience label.

The set of parameters may include metrics that conference monitoring system 100 receives, tracks, derives, and/or extracts from labeled conferences 101. For instance, the metrics may include a quantity of times each participant was disconnected and reconnected, a quantity of instances of packet loss or stuttering experienced by each participant, the resolution or bitrate for each participant connection, a quantity of times that audio, video, and/or other settings were toggled by each participant, network and/or performance metrics (e.g., jitter, round-trip delay time, throughput, etc.), and/or other values related to individual participants during the conference. In some embodiments, the set of parameters may include properties, attributes, etc. (referred to herein simply as "parameters") associated with each conference participant. The conference participant parameters may include a network address (e.g., an Internet Protocol ("IP") address or other type of address), number of network hops, location, device type, user agent, software versioning, network provider, and/or other values that indicate the manner with which each participant connects to and participates in a conference. These parameters may reveal specific incompatibilities that are the root cause of certain conference issues and/or software, hardware, and/or network conflicts that may impact the conference experience.

Accordingly, conference monitoring system 100 may track network performance statistics for each conference participant, user input or interactions (e.g., conference settings that were changed, enabling and/or disabling conference features, and/or keyboard, mouse, touch, and/or other inputs provided during the conference) with a tool, application, and/or service used by each conference participant to access a conference, conference participant parameters (e.g., geographic location, IP address, etc.), and/or the devices and software used by each conference participant to join a conference. In some embodiments, conference monitoring system 100 may track, derive, and/or extract these and other parameters as each participant joins a conference and/or based on network, performance, participant activity, and/or other metrics that conference monitoring system 100 tracks during a conference.

In some embodiments, the set of parameters may track which participant is active at different times in the conference (e.g., who is talking and when, the duration of the activity, etc.) in order to gauge the impact of issues that affect different participants at different times during the conference. For instance, an issue that negatively affects a single listener may likely have a less significant impact on the overall conference experience than if the same issue negatively affects the active speaker and prevents all listening participants from hearing audio associated with the active speaker.

The set of parameters may exclude actual conference content such as spoken dialog, images presented to the conference participates, content that is presented or shared during the conference, and/or specific contributions made by the participants during the conference. In this manner, conference monitoring system 100 may monitor the conference experience while maintaining the privacy of the conference participants.

In some embodiments, the experience label provided with each labeled conference 101 may be a value or identifier that indicates and/or is based on the conference experience (e.g., based on the metrics and/or other information discussed above), and may be provided during or at the end of a conference by one or more of the conference participants based on their individual and collective experience during the conference. For instance, at the completion of each labeled conference 101, conference monitoring system 100 may ask each participant to rate their experience with one or more identifiers (e.g., "great", "average", "poor", "bad", "upvote", "downvote", etc.) or with an alphanumeric score or rating (e.g., "A", "F", "1", "5", etc.). In some embodiments, the conference interface may include a modal interface, pop-up, etc. via which the participants may rate a conference experience, identify various issues experienced during the conference, etc. In some embodiments, conference monitoring system 100 may compute an overall rating or score for each conference 101 based on the individual ratings provided by the participants of that conference 101. Conference monitoring system 100 may tag, label, and/or otherwise associate the individual participant ratings and/or the overall conference rating to the respective conference 101 as an experience label and/or experience classification.

In this manner, a conference experience for participants of a conference may be predicted or otherwise determined in accordance with some embodiments, even without explicit feedback from participants of the conference. As such, appropriate remedial measures may be proactively and automatically taken to enhance or improve the experience of conference participants, thus enhancing the user experience without requiring users to indicate that a problem is being experienced, and/or proactively remediating issues before they degrade the user experience.

Conference monitoring system 100 may input (at 104) each set of parameters and experience labels from each labeled conference 101 into one or more neural networks and/or AI/ML classifiers 103. In some embodiments, one or more other AI/ML techniques or systems, or other suitable techniques or systems, may be used in addition to or in lieu of neural networks and/or AI/ML classifiers 103. Neural networks and/or AI/ML classifiers 103 may generate and/or modify (at 106) different models 105 based on the inputs (e.g., the sets of parameters and experience labels). In particular, each neural network and/or AI/ML classifier 103 may use a different modeling technique to identify groups of parameters that contribute to or are associated with the different experience labels, and may calculate the weight or amount by which each parameter in a particular group contributes to the different experience labels. The weight calculations may be based on the frequency or regularity with which each parameter in a particular group of parameters is found in conferences with a particular experience label and not found in conferences with other experience labels.

Conference monitoring system 100 may validate (at 108) the classification accuracy of each of the generated models 105 by reinputting the labeled conferences 101 (e.g., the different set of parameters from each labeled conference 101) into each model 105, and by determining which model 105 outputs the experience labels and/or classifications associated with labeled conferences 101 with the best fit, the highest probability or correlation, the lowest error rate, and/or other suitable metric based on comparing parameters of labeled conferences 101 to the parameter combinations defined in model 105 for each of the learned labels or classifications. For example, assume that a particular conference is associated with an experience label of "good." A first model may classify the particular conference as "good" with a 65% probability and as "bad" with a 35% probability, and a second model may classify the particular conference as "great" with a 10% probability, as "good" with a 70% probability, and as "bad" with a 20% probability. In this example, conference monitoring system 100 may determine that the second model provides a more accurate classification of the particular conference than the first model as a result of the second model correctly classifying the particular conference with the "good" label with a higher probability than the first model, and also as a result of the second model having an overall lower error rate than the first model. In some embodiments, conference monitoring system 100 may compute a loss function for each generated model, and may perform one or more backpropagation techniques to improve the modeling accuracy of the models. Conference monitoring system 100 may select a particular model 105 from the generated and/or optimized models that classifies labeled conferences 101 to their associated labels with the highest probability, the lowest error rates, and/or otherwise based on a suitable measure of correlation.

Conference monitoring system 100 may receive (at 110) an instruction to determine the overall conference experience and/or individual participant experience for unclassified conference 107. The instruction may include a link (e.g., Uniform Resource Locator ("URL")) to access unlabeled conference 107, and/or parameters or other information associated with unlabeled conference 107, while the conference is live or ongoing. In some embodiments, the instruction may include a recorded copy of unlabeled conference 107 (e.g., recorded video and/or audio associated with unlabeled conference 107, which may be provided while unlabeled conference 107 is ongoing or after unlabeled conference 107 has concluded).

Conference monitoring system 100 may extract (at 112) a set of parameters from unclassified conference 107. Conference monitoring system 100 may input the extracted set of parameters into a selected classification model. In some embodiments, the selected classification model may correspond to the model that was determined to classify the labeled conferences 101 to their associated labels with the highest probability and/or with the lowest error rates. In some embodiments, the selected classification model may include the model that produces the most accurate classifications for the same type of conference as unclassified conference 107. For instance, conference monitoring system 100 may generate different models to classify conferences with fewer than a threshold number of participants, conferences with greater than the threshold number of participants, conferences that have an audio feed but no video feeds, conferences that shared or presented content between participants, conferences that involve certain participants (e.g., the Chief Executive Officer of a company or some other type of designated participant), etc. Conference monitoring system 100 may select the classification model from the different generated models based on the number of participants, feeds, presented content, participants, and/or other parameters associated with unclassified conference 107.

Conference monitoring system 100 may classify (at 114) unclassified conference 107 with an experience label and/or classification that the selected model outputs with the highest probability for the extracted set of parameters. In some embodiments, classifying (at 114) the unclassified conference may include determining a classification label for the experience of each conference participant of unclassified conference 107 and/or for the overall conference. Specifically, for example, conference monitoring system 100 may separately input the subset of parameters that are extracted (at 112) for each conference participant of unclassified conference 107 into the selected model, and the model may output a set of probabilities values for classifying that particular conference participant's experience to each of the classification labels. Conference monitoring system 100 may then compute a classification for the overall conference based on the individual conference participant experiences and/or a weighting that is associated with each conference participant based on each participant's relative contributions or activity during conference 107.

Conference monitoring system 100 may perform (at 116) different actions based on the resulting participant and/or conference classifications. In some embodiments, models 105 and/or other models may associate particular classifications or labels to particular actions or sets of actions. Additionally, or alternatively, models 105 and/or other models may associate particular classifications or labels to specific causes of degraded conference experience, such as network issues, device performance issues, or the like. In some embodiments, such causes of degraded conference experience may be associated (e.g., by models 105 and/or other suitable models) to particular remedial actions.

The actions may include diagnosing and/or detecting issues that may have caused a particular classification for one or more of the conference participants. The actions may include adjusting settings of an ongoing conference or a future conference involving a particular participant in response to diagnosing and/or detecting certain issues. The actions may include generating interfaces or notifications from which a system administrator may monitor the collective conference experience for employees of an enterprise, customers of a conference provider, different office locations or sites, and/or other groups of users. The interfaces or notifications may aggregate and/or summarize the experiences that were determined for different conferences, and may allow an user to isolate a particular conference, and drill-down to see individual participant experiences for the particular conferences, parameters that most contributed to the varying experiences, and/or statistics, operations, or data that may be derived from the parameters and modeled classifications. Conference monitoring system 100 may also provide the interfaces or notifications to individual conference participants so that conference participants may implement changes to optimize their next conference experience.

Figure 2:
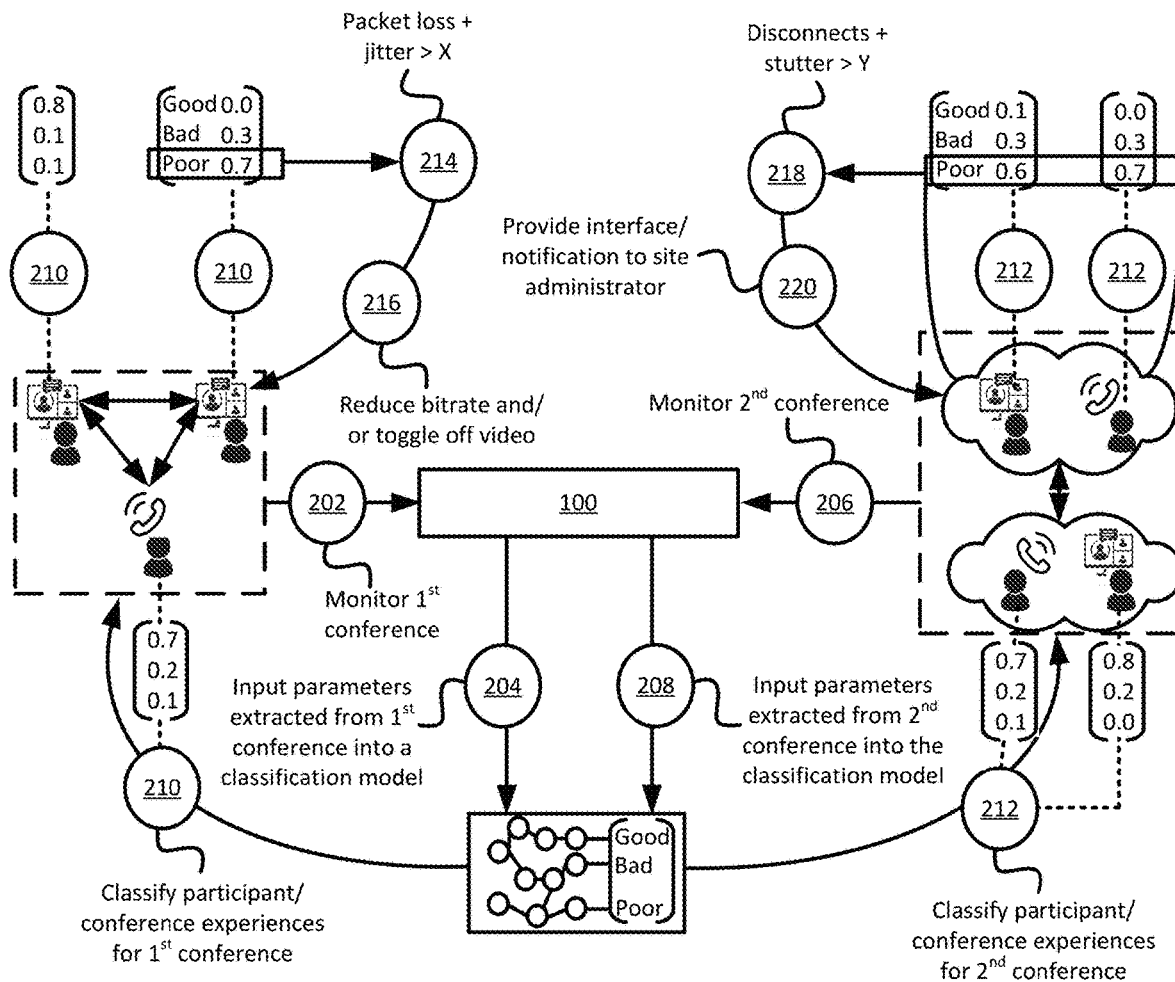
FIG. 2 illustrates an example for implementing different actions in response to modeling the experience of different conferences in accordance with some embodiments presented herein.

FIG. 2 illustrates an example of conference monitoring system 100 implementing different actions in response to modeling the experience of different conferences in accordance with some embodiments presented herein. As shown in FIG. 2, conference monitoring system 100 may monitor (at 202) a first unlabeled conference, and may input (at 204) a first set of parameters, that are extracted from monitoring (at 202) the first unlabeled conference, into a classification model, such as a classification model that has been generated and/or modified using one or more AI/ML techniques. Conference monitoring system 100 may also monitor (at 206) a second unlabeled conference, and may input (at 208) a second set of parameters, that are extracted from monitoring (at 206) the second unlabeled conference, into the classification model.

The model may output (at 210) a first set of probability values for each participant of the first unlabeled conference, and may output (at 212) a second set of probability values for each participant of the second unlabeled conference. Each set of probability values may specify the probability with which the model classifies each particular conference participant's experience to each of the modeled experience labels or classifications. The resulting classifications may reveal that certain conference participants experienced issues that interrupted or disrupted the conference for those participants. Conference monitoring system 100 may classify the overall conference experience for each of the first unlabeled conference and the second unlabeled conference based on the modeled classifications for each participant of the respective conferences and/or different weights computed for each conference participant.

Conference monitoring system 100 may inspect the set of parameters associated with each conference that is classified with a particular experience label or classification (e.g., a negative or "poor" classification), and/or may inspect the subset of parameters extracted for each conference participant whose experience was classified with the particular experience label or classification. The inspection may involve determining the one or more parameters that most significantly contributed to the particular experience label or classification. For a negative classification, the inspection may include identifying any one or more parameters with anomalous values and determining the weighting provided to those parameters in the model. An anomalous value may include a value that is outside an acceptable or expected range, a series of values for a particular parameter that deviate from one another by more than a threshold amount or percentage, a series of values for a particular parameter that deviate from an expected pattern or sequence, a mismatched value, and/or outlying values. For instance, a number of disconnects in excess of a threshold value, packet loss greater than a specified amount for an interval of time, jitter greater than a threshold value, bandwidth that is less than a threshold value, and/or other values that do not satisfy specified thresholds may be identified as the anomalous values.

As shown in FIG. 2, conference monitoring system 100 may determine, from the classifications output (at 210) for the first unlabeled conference, that a particular participant of the first unlabeled conference had a negative or "poor" experience and other participants of the first unlabeled conference had a positive or "good" experience. Accordingly, conference monitoring system 100 may inspect (at 214) the subset of the first set of parameters that are extracted from the particular participant's conference feed, and may determine that the particular participant's conference feed experienced packet loss and jitter that were in excess of specified thresholds.

Conference monitoring system 100 may isolate a first cause for the issues experienced by the particular participant based on the detected anomalies, and may implement (at 216) a first set of actions that may include reducing the resolution or bitrate at which the particular participant connects to the first unlabeled conference, if still ongoing, or for future conferences that the particular participant participates in. In some embodiments, the first set of actions may include connecting the particular participant with only an audio feed and without a video feed, upgrading outdated, incompatible, or a conflicting version of software on the particular participant's device, and/or establishing a network tunnel or otherwise routing the particular participant to an alternative conference server.

Conference monitoring system 100 may determine, from the classifications output for the second unlabeled conference, that a particular group of participants connecting to the second unlabeled conference from a particular office location or site had a negative or "poor" experience and other participants connecting to the second unlabeled conference from other locations or sites had a positive or "good" experience. Accordingly, conference monitoring system 100 may inspect (at 218) the subset of the second set of parameters associated with the particular group of participants, and may determine that the particular group of participants experienced disconnects and video stuttering that were in excess of specified thresholds.

Conference monitoring system 100 may isolate a second cause for the issues experienced by the particular group of participants at the particular office location or site based on the detected anomalies, and may implement (at 220) a second set of actions that may include generating an interface or notification that indicates connectivity issues at the particular office location or site. For instance, the interface may present conference experiences from different office locations or sites, and may highlight or otherwise differentiate the poor experience occurring at the particular office location or site for an administrator at the particular office location or site or for an administrator that manages the conferencing experience or network for all the office locations or sites.

Figure 3:
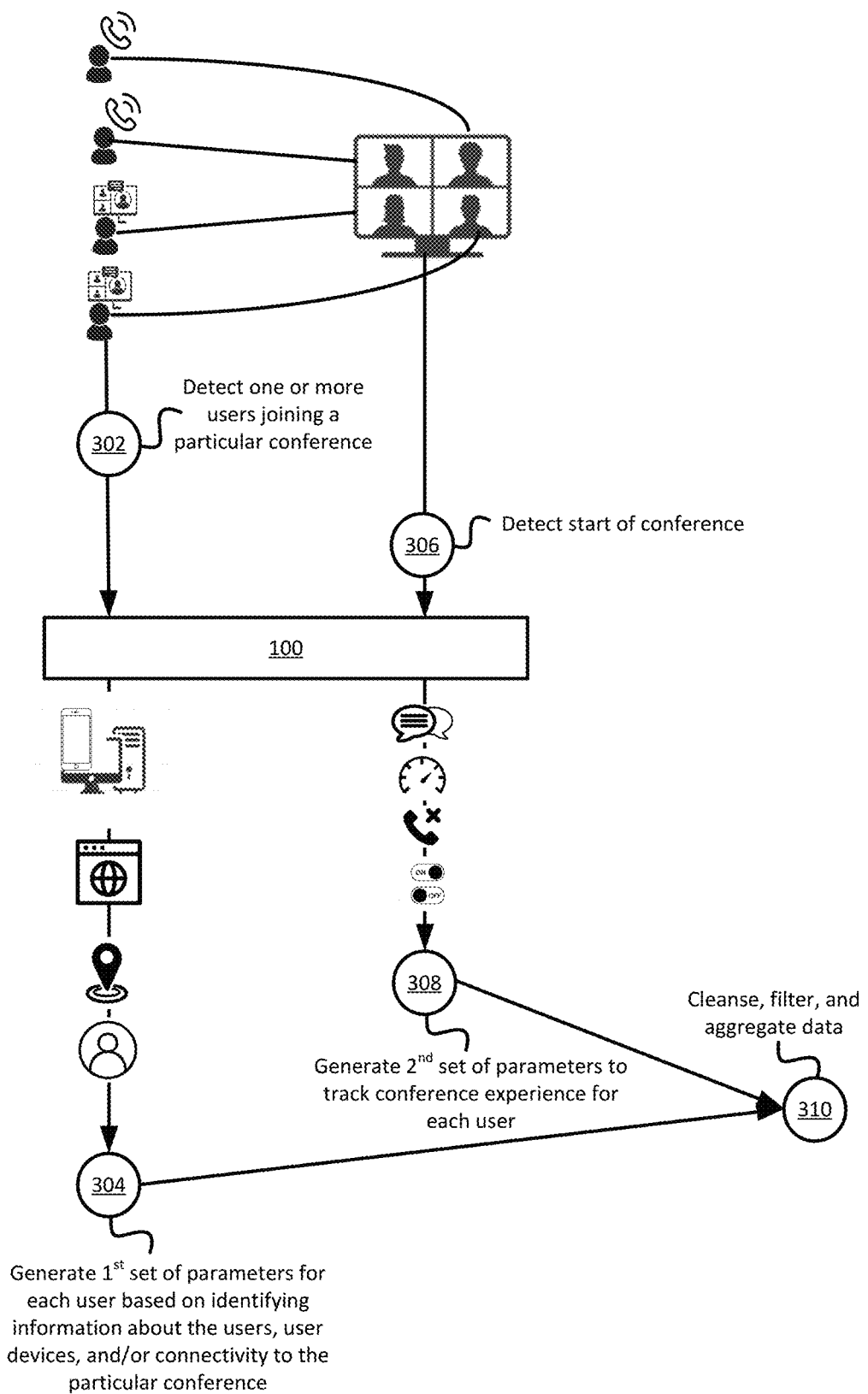
FIG. 3 illustrates a conference parameter monitoring and tracking example in accordance with some embodiments presented herein.

FIG. 3 illustrates a conference parameter monitoring and tracking example in accordance with some embodiments presented herein. Conference monitoring system 100 may connect to and/or access each conference as that conference commences with at least one participant joining the conference. For instance, conference monitoring system 100 may include one or more devices or systems that implement, are implemented by, and/or are communicatively coupled to a conference hosting system. The conference hosting system may indicate to conference monitoring system 100 when a conference begins, so that conference monitoring system 100 may perform the parameter tracking as described above. In some embodiments, one or more conference participants may connect through conference monitoring system 100 in order to join the conference. For instance, devices of the conference participants may run an application that exchanges data packets with conference monitoring system 100 over a network in order to connect to and participate in different conferences with different conference participants.

As shown in FIG. 3, conference monitoring system 100 may detect (at 302) one or more users joining a particular conference. Conference monitoring system 100 may generate (at 304) a first set of parameters based on identifying information about the one or more users, devices of the one or more users, and/or connectivity of the one or more users to the particular conference. For instance, conference monitoring system 100 may obtain the network address, geographic location, user agent, software version, device type (e.g., make and model), bandwidth, round-trip-time, and/or other metrics for the first user based on data packets the user devices send in order to join the conference and/or other identifying information provided by the user devices in response to queries from conference monitoring system 100. Some of the parameters may be obtained from the data packet headers, pinging the user devices, login information provided by the user devices, profiles associated with each user, network traceroutes, and/or other diagnostic tools.

Conference monitoring system 100 may detect (at 306) when the particular conference commences, and may generate (at 308) a second set of parameters to track the experience of each user during the particular conference. The particular conference may commence once two or more users have joined the particular conference, and/or the two or more users begin speaking, sharing, or otherwise interacting with one another. In some embodiments, as noted above, the second set of parameters do not involve or include the actual conference data such as the spoken dialog, the video content, and/or other content shared between the users. Instead, conference monitoring system 100 may track metrics related to how often a user's feed is interrupted, delayed, and/or changed, which conference settings are manually adjusted by users (e.g., volume, brightness, etc.), performance metrics of the user devices (e.g., processor load, memory load and/or capacity, etc.), network performance (e.g., throughput, latency, jitter, etc.), and/or other experience-related metrics. For instance, the second set of parameters may measure a quantity of times that a user connects and/or disconnects from the particular conference, a quantity of times that a bitrate for the conference is switched for each user (e.g., in variable bitrate conferences in which bitrate may be automatically and/or manually adjusted based on network performance or other conditions), a quantity of times a user changes settings (e.g., toggles a microphone or video on and off), packet loss, jitter, bandwidth, and/or other packet delivery metrics for each user, processor usage on the user devices, fan speed on the user devices, and/or other metrics obtained from the user devices, each user's conference feed, application, and/or service, and/or the network connection established by each user device.

The second set of parameters may also include metrics related to user activity including times and/or durations that each user speaks or obtains focus during the conference, a type or amount of content shared by each user, a quantity of interruptions (e.g., one speaker speaks while another speaker is also speaking), and/or other metrics quantifying interactions of the different users during the particular conference. These metrics may be used to gauge the severity of any identified issue and/or to adjust the weights or scores that are given to the modeled parameters. For instance, assume that a particular issue interrupts a particular participant's conference feed. If that particular participant is merely listening to a presenter and the particular participant is located at a remote location from the other participants, then the weight that is attributed to the one or more parameters associated with that issue may be decreased as the issue may be minimally impactful to the overall conference experience and/or the experience of the more important participants or the majority of the participants. Conversely, if the particular participant is the conference leader and is speaking for the majority of the conference, the issue is much more impactful to the overall conference experience, and the weight that is attributed to the one or more parameters associated with that issue may be increased.

Conference monitoring system 100 may modify (at 310) the parameters that are tracked from a conference prior to inputting the parameters into a neural network or AI/ML classifier. The parameter modification (at 310) may include cleansing, filtering, and/or biasing the parameters. Specifically, conference monitoring system 100 may reduce a sequence of values obtained for a single parameter into a count, may compute average, mean, media, and/or derived value from different values tracked for the same parameter or different parameters, may filter the values to retain outlying or anomalous values, and/or may attribute different weights to the parameters generated for a particular user based on the participation level of the particular user when a value is tracked for the different parameters or based on the activity of the particular user relative to the other users.

Figure 4:
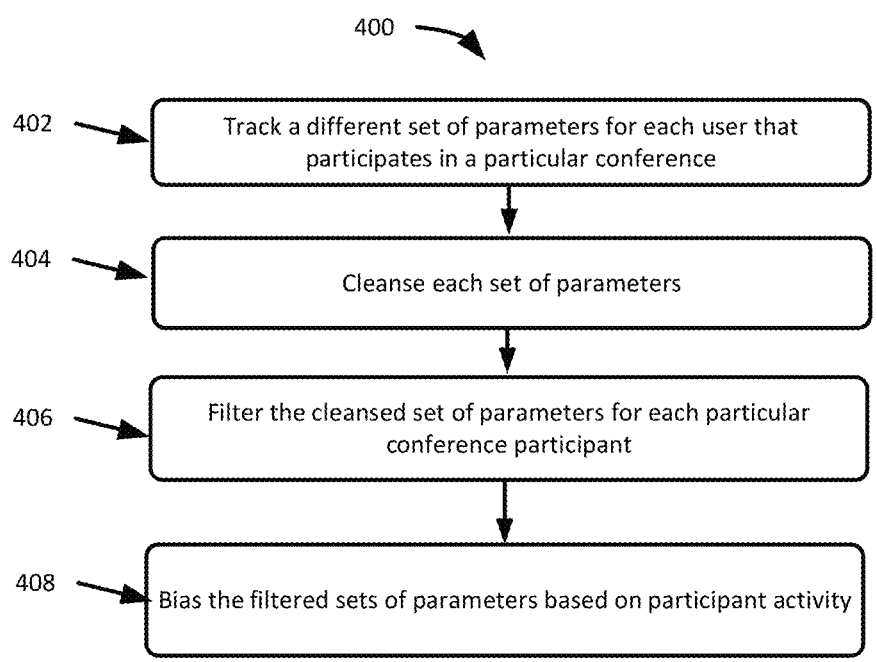
FIG. 4 presents a process for performing the parameter modification in accordance with some embodiments presented herein.

FIG. 4 presents a process 400 for performing the parameter modification in accordance with some embodiments presented herein. Process 400 may be implemented by conference monitoring system 100.

Process 400 may include tracking (at 402) a different set of parameters for each user that participates in a particular conference. Each parameter may include one or more values for a different experience aspect or attribute of the particular conference that is monitored on a per user basis. For instance, the bitrate or bandwidth for a particular participant may change and may have different values throughout the particular conference, whereas the total number of disconnects or packet loss experienced by the particular participant may be a single count or value.

Process 400 may include cleansing (at 404) each set of parameters. In some embodiments, cleansing (at 404) a set of parameters may include removing whitespace, calculating mean, minimum, maximum, and/or other derived values for parameters that have multiple values, and/or determining or retaining parameters with derived values that are outside an acceptable range or threshold range. In some embodiments, cleansing (at 404) a set of parameters may include selecting and/or retaining the worst one-minute patch for each parameter. For instance, rather than retain all values that are generated for a particular parameter over the entire course of the particular conference, conference monitoring system 100 may compute the average value for the particular parameter over the entire course of the particular conference, and may determine and/or retain the values that were generated over a one-minute interval that deviate the most from the average value. For instance, conference monitoring system 100 may track the latency on each participant's connection every 10 seconds. Rather than retain all the latency values, conference monitoring system 100 may compute the average latency and retain the latency value with the largest difference from the average latency, or may retain the maximum, minimum, and/or average latency values.

Process 400 may include filtering (at 406) the cleansed set of parameters for each particular conference participant. Filtering (at 406) a parameter may include determining and/or retaining one or more cleansed parameter values that are outside an acceptable range or threshold range.

Process 400 may include biasing (at 408) the filtered sets of parameters based on participant activity. For instance, conference monitoring system 100 may determine which participant was active and/or speaking at different points throughout the particular conference, may merge the participant activity information with the parameter values generated at the corresponding points or times, and/or may adjust the parameter values for a particular participant based on whether or not the particular participant was active at the time in the conference when those parameter values were generated. Accordingly, conference monitoring system 100 may adjust parameter values that were generated for a first participant during a first time when the first participant was active while parameter values that were generated for the first participant after the first time may remain unadjusted. The biasing (at 408) may be used to identify and/or attribute greater weights to the parameters or parameter values that are more impactful and/or that contribute greater to the overall experience. In some embodiments, the biasing (at 408) may include determining the relative activity of each conference participant (e.g., the percentage of time during which each participant is active), and biasing the parameter values for each participant according to the determined relative activity of that participant.

Figure 5:
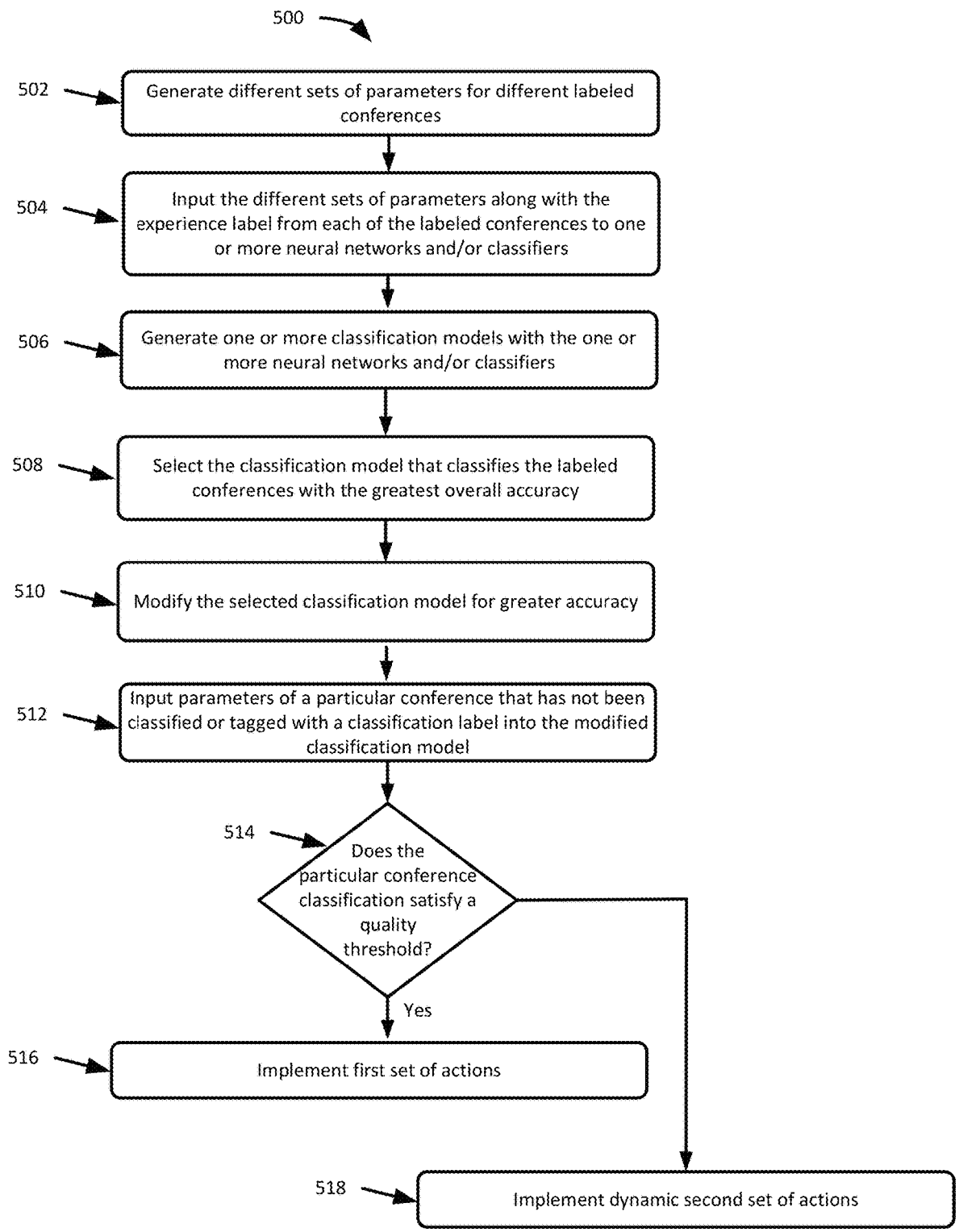
FIG. 5 presents a process for optimizing the conference experience based on a conference classification model that is generated using artificial intelligence/machine learning ("AI/ML") techniques, in accordance with some embodiments presented herein.

Conference monitoring system 100 may input the cleansed, filtered, and/or biased parameters into one or more neural networks and/or AI/ML classifiers in order to generate one or more predictive models that classify conference experiences and to implement actions to improve the conference experiences. FIG. 5 presents a process 500 for optimizing the conference experience based on a conference classification model that is generated using AI/ML in accordance with some embodiments presented herein. Process 500 may be implemented by conference monitoring system 100.

Process 500 may include generating (at 502) different sets of parameters for different conferences that have been labeled with one or more experience labels by the participants of those conferences. Generating (at 502) the different sets of parameters may include extracting, cleansing, filtering, and/or biasing the parameter values from each labeled conference.

Process 500 may include inputting (at 504) the different sets of parameters along with the experience labels from each of the labeled conferences to one or more neural networks and/or AI/ML classifiers. For instance, conference monitoring system 100 may input the different sets of parameters and associated experience labels into one or more Convolutional Neural Networks ("CNNs"), Recurrent Neural Networks ("RNNs"), and/or other deep learning neural networks.

Process 500 may include generating (at 506) one or more classification models using the one or more neural networks and/or AI/ML classifiers and the different sets of parameters and experience labels that are input (at 504) to the one or more neural networks and/or AI/ML classifiers. Specifically, the neural networks and/or AI/ML classifiers may use various AI/ML techniques to determine a subset of parameters from the different sets of parameters that frequently, regularly, and/or commonly appear in conferences with a particular experience label and that do not appear in conferences with other experience labels. For instance, eXtreme Gradient Boosting ("XGBoost") (e.g., a first CNN) may define a first subset of parameters that result in the particular experience label, and Light Gradient Boosting ("LightGBM") (e.g., a second CNN) may define a different second subset of parameters that result in the particular experience label despite both CNNs being trained on the same data (e.g., the different sets of parameters and experience labels). Additionally, the neural networks and/or AI/ML classifiers may quantify the contribution of each parameter from the subset of parameters to the particular classification based on the frequency with which that parameter appears in the conferences with that particular classification and the infrequency with which that same parameter does not appear in conferences with other classifications. In other words, the neural networks and/or AI/ML classifiers may assign a weight or score to each parameter. Accordingly, each classification model may use different subsets of parameters and may assign different weights to the parameters in order to determine the probabilities with which to classify conferences with those parameters to the different experience labels and/or classifications.

Process 500 may include selecting (at 508) the classification model that classifies the labeled conferences with the greatest overall accuracy. More specifically, conference monitoring system 100 may input the different sets of parameters along with the experience labels from each of the labeled conferences into the generated (at 506) classification models, may compare the classification probabilities that each classification model outputs for a conference against the label that is specified for that conference, and may select (at 508) the classification model that most consistently and most accurately classifies the conferences with the specified labels for those conferences.

For instance, conference monitoring system 100 may train a first classification model using a first AI/ML technique and a parameters from a particular set of labeled conferences that labeled and/or classified with one of a first label or a second label, and may train a second classification model using a different second AI/ML technique and the same parameters from the same particular set of labeled conferences. Each of the first classification model and the second classification model may output a probability vector with 2 values that represent the probability that a conference should be labeled with one of the two learned classifications (e.g., the first label or the second label). Conference monitoring system 100 may input parameters of a first conference that is labeled with the first label, and parameters of a second conference that is labeled with the second label into each of the first and second classification models. Conference monitoring system 100 may select the second classification model as the most accurate classification model in response to the first classification model classifying the first conference with a 70% probability for the first label and a 30% probability for the second label and the second conference with a 40% probability for the first label and a 60% probability for the second label, and further in response to the second classification model classifying the first conference with the same 70% probability for the first label and the same 30% probability for the second label and the second conference with a more accurate 15% probability for the first label and a 85% probability for the second label.

Process 500 may include modifying (at 510) the selected classification model for greater accuracy. In some embodiments, conference monitoring system 100 may define and/or compute a loss function for the selected classification model, and may perform a backpropagation technique to optimize certain pathways or classifications within the classification model based on the loss function output.

The loss function may be used to determine classification model's error rate. based on the difference between the predicted labels (e.g., the probabilities output by the classification model) and the assigned label for the input data. For instance, if the classification model classifies a conference to a particular label with a 90% probability (e.g., a probability vector value of 0.9), and the conference is associated with that particular label, then the loss function may determine that the classification model has a 10% or 0.1 error rate for the classification of the particular label. The loss function may compute the total error rate of the model based on the error rate between the predicted classification for each labeled conference provided as input and the associated label of those labeled conferences.

Conference monitoring system 100 may use the loss function and/or the quantified error to isolate the one or more parameters or pathways within the classification model that contribute to or are the cause of the error rate for specific classifications, and may modify those parameters or the weighting attributed to those parameters using one or more backpropagation techniques. More specifically, the loss function may identify certain parameters and/or weights in the modeling that increase the error rate and/or other parameters and/or weights in the modeling that insufficiently contribute to the proper classifications, and may use the backpropagation techniques to modify those parameters or weights.

The backpropagation may include adding new parameters to the classification of a particular experience label, removing one or more parameters currently used in classification of the particular experience label, and/or adjusting the weights or scores with which a parameter contributes to the particular experience label classification. For instance, conference monitoring system 100 may substitute one parameter from a set of parameters in the classification model from which a particular classification label is determined with a different parameter. Conference monitoring system 100 may then reinput the labeled conference examples to the modified classification model in order to determine if the modified classification model classifies the labeled conference examples more accurately with the changed parameter than without the changed parameter.

Conference monitoring system 100 may use the modified classification model to classify conference experiences and to trigger different actions based on the classified experiences. Accordingly, process 500 may include inputting (at 512) parameters of a particular conference that has not been classified or tagged with a classification label into the modified classification model. Process 500 may include determining (at 514) if the classification that is output for the particular model by the modified classification model satisfies a quality threshold for implementing different actions. The determination (at 514) may be based on the modified classification model classifying, with at least a specified probability value, the particular conference to one or more labels or classifications that set the quality threshold.

In response to determining (at 514—Yes) that the classification satisfies the quality threshold, process 500 may include implementing (at 516) a first set of actions. For instance, conference monitoring system 100 may implement the first set of actions in response to the particular conference being classified with a score of 3 or more or with a label of "good" or "great". The first set of actions may include generating a dashboard or user interface ("UP") that incorporates the experience classification for the particular conference along with the experience classifications of other conferences. In some embodiments, conference monitoring system 100 may implement no actions in response to determining (at 514—Yes) that the classification satisfies the quality threshold.

In response to determining (at 514—No) that the classification does not satisfy the quality threshold, process 500 may include implementing (at 518) a different dynamic second set of actions. For instance, conference monitoring system 100 may select different actions to apply in response to the particular conference being classified with a score less than 3 or with a label of "poor" or "bad", and further in response to the determined source of the negative experience. Implementing (at 518) the dynamic second set of actions may include inspecting the parameters of the particular conference in order to determine if one or more participants had a negative experience or if the all participants had a negative experience. For instance, conference monitoring system 100 may determine which of the input parameters contained anomalous values and if those parameters were specific to one or more participants or applied to all participants. Conference monitoring system 100 may then dynamically select the second set of actions to implement based on which parameters are determined to have the anomalous values and whether the anomalous values affected all participants or a subset of participants.

The second set of actions may include different modifications that conference monitoring system 100 may perform in order to improve the experience for one or more participants during an active conference and/or for future conferences. Conference monitoring system 100 may improve the conference experience by automatically configuring settings for different conference participants based on the parameters and the experience tracked for those participants. Alternatively, conference monitoring system 100 may detect conferences or conference participants that are having or have had a negative experience based on the classifications, and may diagnose, detect, and/or isolate issues that are the cause for the negative experience so that the participant or conference administrator may address the issues. In some embodiments, conference monitoring system 100 may create a UI that compiles the experiences and/or parameters from multiple conferences in order to detect trends, patterns, and/or issues that are not isolated to an individual conference or participant, and that are more widespread or systemic.

In some embodiments, conference monitoring system 100 may link certain parameters or anomalous values of certain parameters to specific remedial actions. For instance, conference monitoring system 100 may automatically disable a video stream and retain only an audio stream for a particular participant if the bandwidth parameter and/or disconnect parameter for that particular participant contain anomalous values. Alternatively, conference monitoring system 100 may generate a notification that is provided to a site administrator in response to determining that all participants from a particular office location or site have the same anomalous parameter values.

In some embodiments, conference monitoring system 100 may use AI/ML, to determine the remedial action for different subsets of parameters with different anomalous values. For example, conference monitoring system 100 may monitor a conference, may detect a particular parameter for a particular participant that has an anomalous value during a first time, a settings change made by the particular participant, and the particular parameter returning to a normal value after the settings change by particular participant. In this example, conference monitoring system 100 may dynamically determine to automatically apply the same settings change in response to the particular parameter for other conference participants having the same anomalous values.

Figure 6:
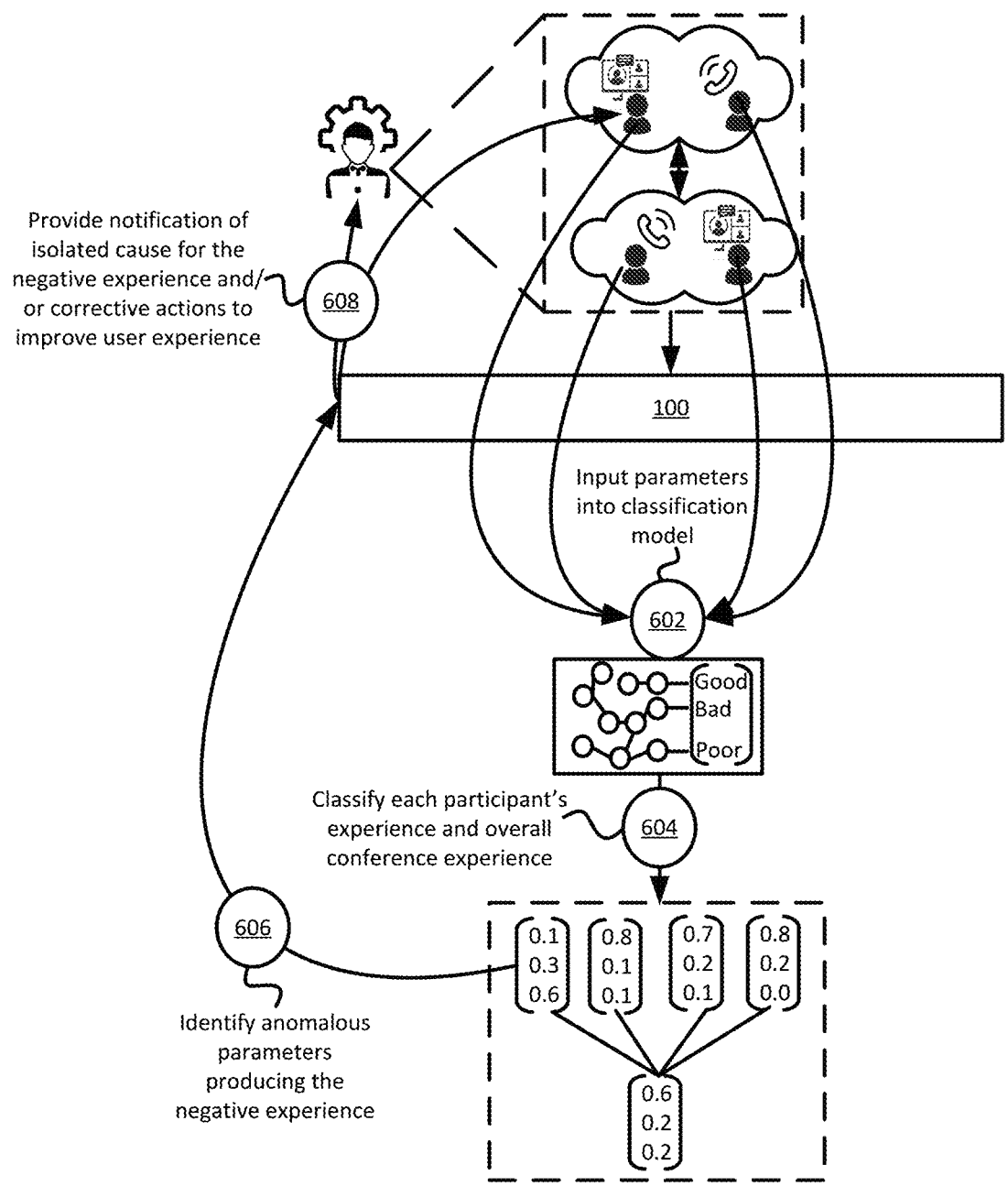
FIG. 6 illustrates an example of automatically optimizing a conference based on a classification of the conference experience in accordance with some embodiments presented herein.

FIG. 6 illustrates an example of automatically optimizing a conference based on a classification of the conference experience in accordance with some embodiments presented herein. Conference monitoring system 100 may obtain parameters for each participant of a conference, and may input (at 602) the set of parameters for the conference into an optimized classification model.

The model may produce (at 604) output that provides a high probability of a positive experience for all but one participant, and that provides a high probability of a positive experience for the overall conference. In response to detecting the negative experience for the single conference participant, conference monitoring system 100 may inspect (at 606) the parameters that were extracted from that participant's feed and/or the modeling of those parameters in order to isolate the cause for the participant's negative experience.

Conference monitoring system 100 may perform (at 608) one or more actions that are linked to the isolated cause of the negative experience. In some embodiments, the one or more actions may be dynamically selected based on the isolated cause of the negative experience. To isolate the cause, conference monitoring system 100 may inspect the model to determine the parameters that contributed the most or had the greatest impact on the negative classification. This may include identifying parameters with values that deviate the most from an acceptable range, parameters with specific values that are linked to specific issues (e.g., incompatible software, software versions, or devices, network location with poor connectivity, traceroute through unstable network hops, etc.), and/or parameter combinations that are associated with specific issues (e.g., a large number of disconnects with high packet loss being associated with a first issue and a large number of disconnects with excessive processor utilization being associated with a second issue). For example, the model may output the same negative classification in response to parameters of a first conference having an abnormal amount of disconnects and a mismatched software version for a participant, and parameters of a second conference having an abnormal amount of video and audio stutter for a participant. Based on the parameter abnormalities detected for the first conference, conference monitoring system 100 may attribute the negative experience to the mismatched software version, and may instruct the particular participant to update the software to the latest version or may automatically upgrade the software on the particular participant's device. Based on the parameter abnormalities detected for the second conference, conference monitoring system 100 may attribute the negative experience to insufficient bandwidth, and may deactivate the video feed and/or lower the audio quality of the audio feed to improve the user experience.

As shown in FIG. 6, conference monitoring system 100 may provide (at 608) notifications to the particular participant classified with the negative experience and/or an administrator for the conference. The notifications may identify the particular participant that the model classifies as having the negative experience and/or may include the one or more actions for correcting the isolated cause of the negative experience.

The notifications may free the administrator from having to monitor each and every conference. For instance, the administrator may be tasked with overseeing the experience across hundreds of conferences. Such a task may be impossible if the administrator was to monitor each conference individually. Conference monitoring system 100 may assume the monitoring task, and may notify the administrator when a negative experience is detected, thereby freeing the administrator to resolve the issues while conference monitoring system 100 continues to monitor the conferences.

In some embodiments, conference monitoring system 100 may automatically implement the corrective actions in response to the model classifying one or more conferences or conference participants as having a negative experience. The set of corrective actions may include reducing the bitrate at which the particular participant's device accesses the conference, deactivating the video stream for the conference on the particular participant device, and/or adjusting other settings of the application or device used by the particular participant to access the conference.

In some embodiments, conference monitoring system 100 may generate UIs for monitoring multiple conferences, isolating issues affecting various conference or conference participants, and/or managing the experiences across different conferences. The UIs may present experiences associated with different conferences, and may aggregate the experiences across different networks, locations, devices, software, and/or other domains to expose insights for diagnosing broader-scale issues that may impact multiple conferences and not be isolated to a single conference. Additionally, the UIs may summarize the model output for different conferences and/or individual conference participants so insights such as the most impactful parameters may be exposed and/or used to improve the classification model accuracy. In some embodiments, conference monitoring system 100 may generate notifications and/or may implement various corrective actions in response to the different insights exposed by the UIs.

FIG. 7 illustrates example UI 700 for presenting an experience score for different conferences in accordance with some embodiments presented herein. UI 700 may be generated for a conference administrator or a conference provider that hosts, sells, and/or otherwise manages the conferencing solution or tool used within an enterprise, by different customers, and/or by different systems. To generate UI 700, conference monitoring system 100 may input different sets of parameters for the different conferences into a classification model, may record the experience classification or score that is generated by the classification model for each conference and/or for each conference participant, and may populate UI 700 with identifier 701 for each conference, various conference information 703 (e.g., start time, end time, duration, etc.), and scores 705 that rate each conference experience.

UI 700 may provide a dashboard from which a single administrator may oversee different conference experiences, may visually identify one or more conferences that are experiencing or have experienced a poor quality of service, and/or may take corrective actions to resolve the issues affecting the conferences with the lowest scores or worst experiences. For instance, a visual identifier (e.g., a specific symbol or color) and a corresponding score for entries 707 and 709 may readily indicate that these two conferences experienced multiple impactful issues that resulted in a poor overall experience.

In some embodiments, UI 700 may be customized. For instance, a user may filter UI 700 to present conferences with at least one endpoint at a particular office location, to present conferences involving specific participants (e.g., employees with executive roles, sales employees, support staff, etc.), and/or to present conferences with specific parameters or parameter values (e.g., conferences involving a particular device type, software version, network address subnet, etc.).

Each of the entries or rows in UI 700 may represent a different conference, and may be selectable. Conference monitoring system 100 may generate a drill-down UI that provides statistical insight as to the experience rating for the selected conference. In some embodiments, the drill-down UI may identify the experience classification for each participant of the selected conference. In some embodiments, the drill-down UI may present various visualizations for the conference parameters that had the greatest impact or effect on the experience classification and scoring. In some embodiments, multiple or all conferences may be selected at the same time, and conference monitoring system may generate a drill-down UI that accounts for the parameters of the selected conferences in provided visualizations.

Figure 8:
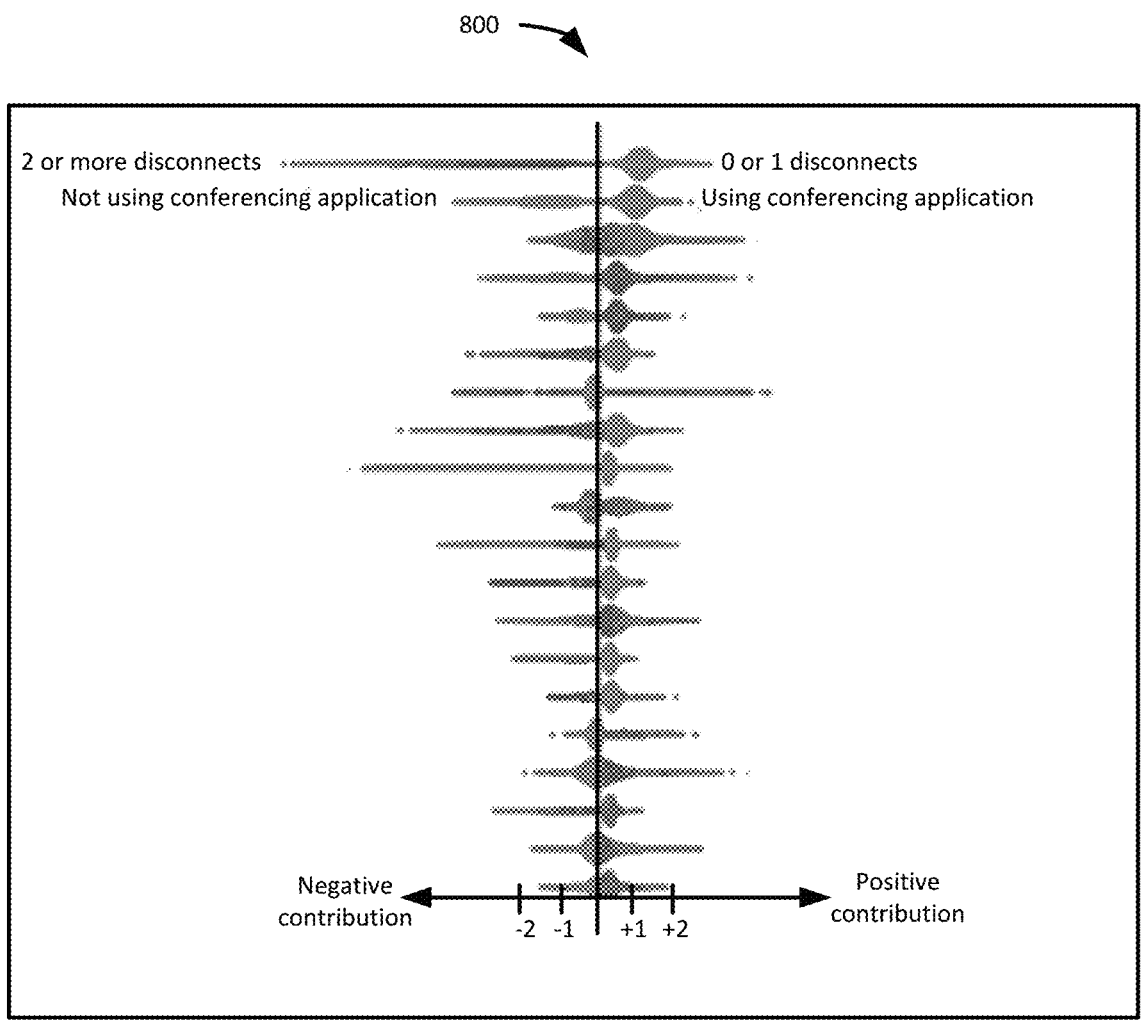
FIG. 8 illustrates an example UI providing a drill-down visualization for different parameter contributions to the overall experience or classification of a conference in accordance with some embodiments presented herein.

FIG. 8 illustrates example UI 800 providing a drill-down visualization for different parameter contributions to the overall experience or classification of a conference in accordance with some embodiments presented herein. Each entry or row in UI 800 may correspond to a different monitored conference parameter. For instance, the first entry or row may represent the number of disconnects that are detected during the conference, the second entry or row may represent whether a conference participant was using a specialized application to access the conference or a generic web browser, and the third entry or row may represent the fan speed on each participant device.

Conference monitoring system 100 may order the parameters according to their relative impact on the conference classification or experience. For instance, the parameter represented by the first entry or row may have a more significant impact on the classification of the conference than the parameter represented by the second entry or row. Conference monitoring system 100 may determine the relative contribution of each parameter to the overall classification based on the amount of variance in the parameter values from an acceptable threshold or expected value and/or based on the score that the classification model attributes to that parameter and/or the variance in the parameter value. As shown in UI 800, the first entry identifies a significant correlation between two or more disconnects and a negative conference experience and a minimal correlation between zero or one disconnects and a positive conference experience. Similarly, the second entry identifies a significant correlation between conference participants that do not use a specialized conference application (e.g., participants that use a web browser interface) and a negative conference experience and a minimal correlation between participants that use the specialized conference application and a positive experience.

From UI 800, conference monitoring system 100 and/or an administrator may determine the parameters that were most impactful or most contributed to the experience classification provided for the conferences that were included as part of the UI 800 visualization. As noted above, the visualization may be generated for all conferences monitored by conference monitoring system 100 or for a selected subset of conferences that may be of particular interest or that may be related in some manner (e.g., a similar experience classification, involve geographically proximate locations, traverse the same networks, involve specific participants, etc.).

In some embodiments, conference monitoring system 100 may generate drill-down interfaces for individual conference participants as well as for individual conferences or selected sets of conferences. For instance, a user may select the UI element for one of the conferences presented in UI 700, and UI 700 may expand to present UI elements for each participant of the selected conference. A user may then select the UI element for a particular participant, and conference monitoring system 100 may present one or more Us for visualizing the impact of parameters that were specific to that particular participant's experience as opposed to the parameters for the entire conference.

Figure 9:
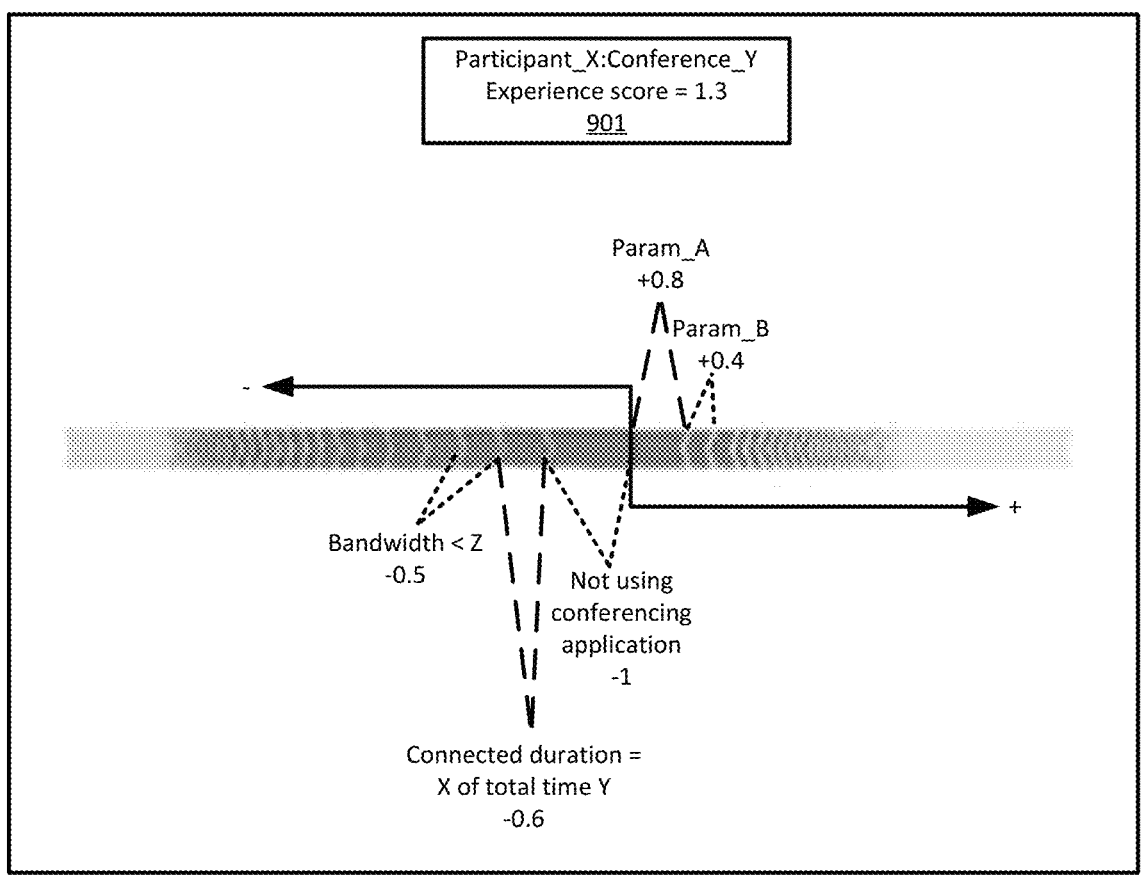
FIG. 9 illustrates an example UI providing a drill-down visualization for contributions of different parameters for a particular participant to a conference in accordance with some embodiments presented herein.

FIG. 9 illustrates example UI 900 providing a drill-down visualization for contributions of different parameters for a particular participant to a conference in accordance with some embodiments presented herein. UI 900 may present score 901 that quantifies the particular participant's experience. Additionally, UI 900 may present the contribution or weighting that the model attributes to individual parameters of the subset of parameters used by the classification model to generate score 901. The subset of parameters may include some of the parameters that were extracted for the particular participant during the conference.

UI 900 illustrates that the most significant parameters that contributed to the participant's overall negative experience included the particular participant not using a conference-specific application to join the conference, the particular participant being connected for a short duration of the overall conference, and low bandwidth. UI 900 further illustrates that the parameters that improved the conference experience for the particular participant were not as impactful to overcome the negative affects by the parameters that degraded the conference experience.

UI 900 may provide a visualization from which the particular participant, administrator, and/or another user may take corrective action to improve the experience for a future conference. In some embodiments, conference monitoring system 100 may generate one or more notifications to send to the particular participant, administrator, and/or another user based on the insights of UI 900. For instance, the notifications may identify the four parameters that the model determines most significantly contributed to the particular participant's negative experience, and may include suggested actions for resolving the issues that stem from the identified parameters.

In some embodiments, conference monitoring system 100 may generate customized UIs to mix-and-match different parameters, scores, participants, and/or conference, and to present a visualization that provide customized insight into the impact of specific monitored parameters, common issues affecting sets of conferences, experiences of specific participants across different conferences, and/or groups of conferences of a certain size (e.g., a minimum number of participants), at specific sites or locations, at different times of day, etc. For instance, conference monitoring system 100 may generate custom UIs to track the experience of specific persons-of-interest (e.g., the Chief Executive Officer, sales agents, technical support staff, teachers, doctors, etc.), and to present visualizations that summarize the experience of those users across different conferences.

In some embodiments, conference monitoring system 100 may generate UIs that identify how the experience of one participant may affect the experience of other participants. For instance, if a participant that does not actively participate (e.g., does not speak or present) in a conference experiences certain issues, then the impact on other participants is minimal or insignificant. However, if the main speaker or presenter of a conference experience one or more issues, then other participants may be unable to hear, see, or understand what the speaker or presenter is presenting, and the other participants may have a negative experience as well.

Figure 10:
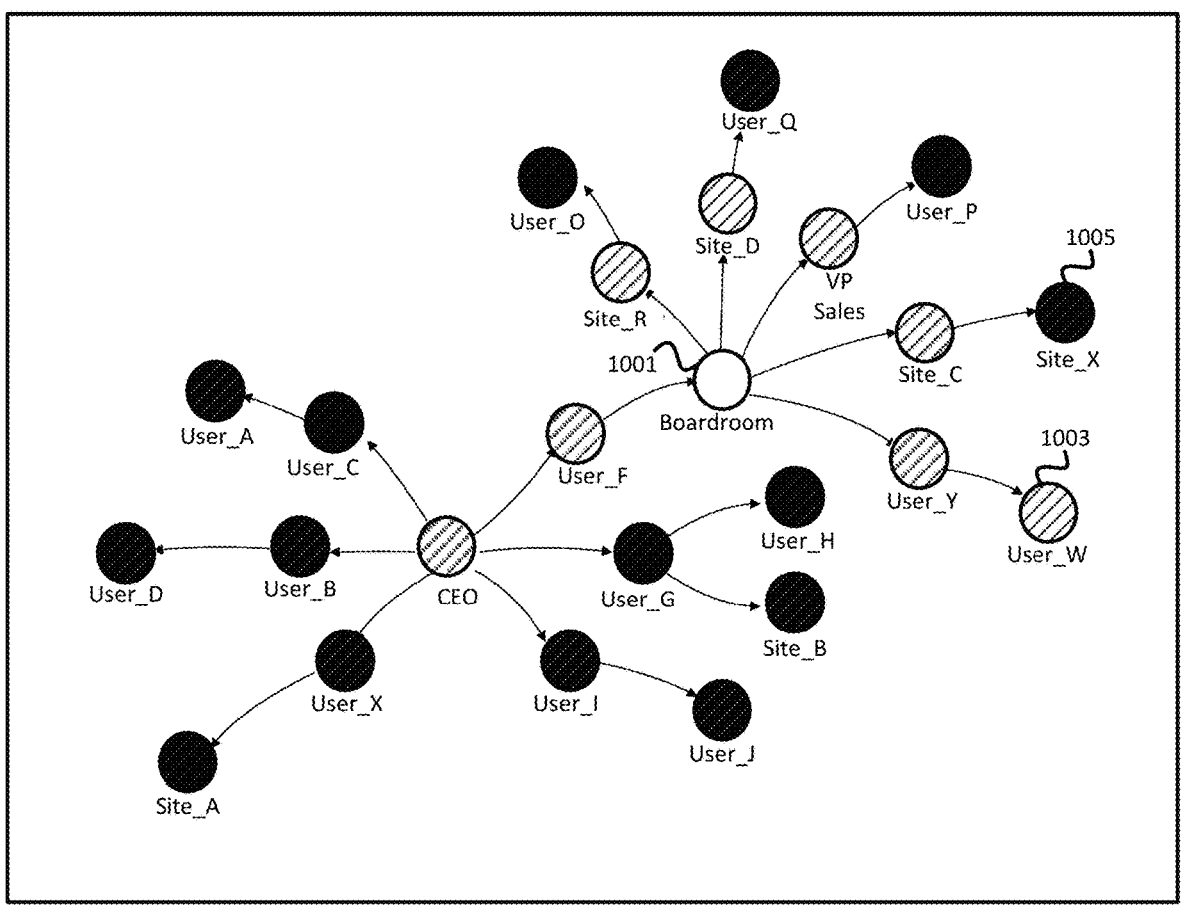
FIG. 10 illustrates example an UI providing a visualization for the impact between different conference participants in accordance with some embodiments presented herein.

FIG. 10 illustrates example UI 1000 providing a visualization for the impact between different conference participants in accordance with some embodiments presented herein. UI 1000 may include a graphical element that represents a conference participant and/or a location or site from which one or more participants access a conference. Each graphical element may have one of several different coloring, shading, and/or representation to visually identify the experience that is determined for that participant or location. For instance, blank graphical element 1001 may represent a poor experience (e.g., multiple or significant issues), patterned graphical element 1003 may represent a good experience (e.g., few or insignificant issues), and solid graphical element 1005 may represent a great experience (e.g., no issues). Additionally, UI 1000 may include links between the graphical elements to identify the primary presenters of a conference and the participants that were not actively engaging in the conference. For instance, the leaf nodes in UI 1000 may represent participants that listened but did not contribute to a conference.

UI 1000 may provide an administrator with a graphical map for the source or cause of multiple conference participants having a negative experience. Each graphical element may be selectable. Conference monitoring system 100 may provide UI 800, UI 900, and/or another UI in response to a graphical element of UI 1000 being selecting. For instance, conference monitoring system 100 may provide a UI that identifies the parameters for the classification or experience represented by the selected graphical element.

Figure 11:
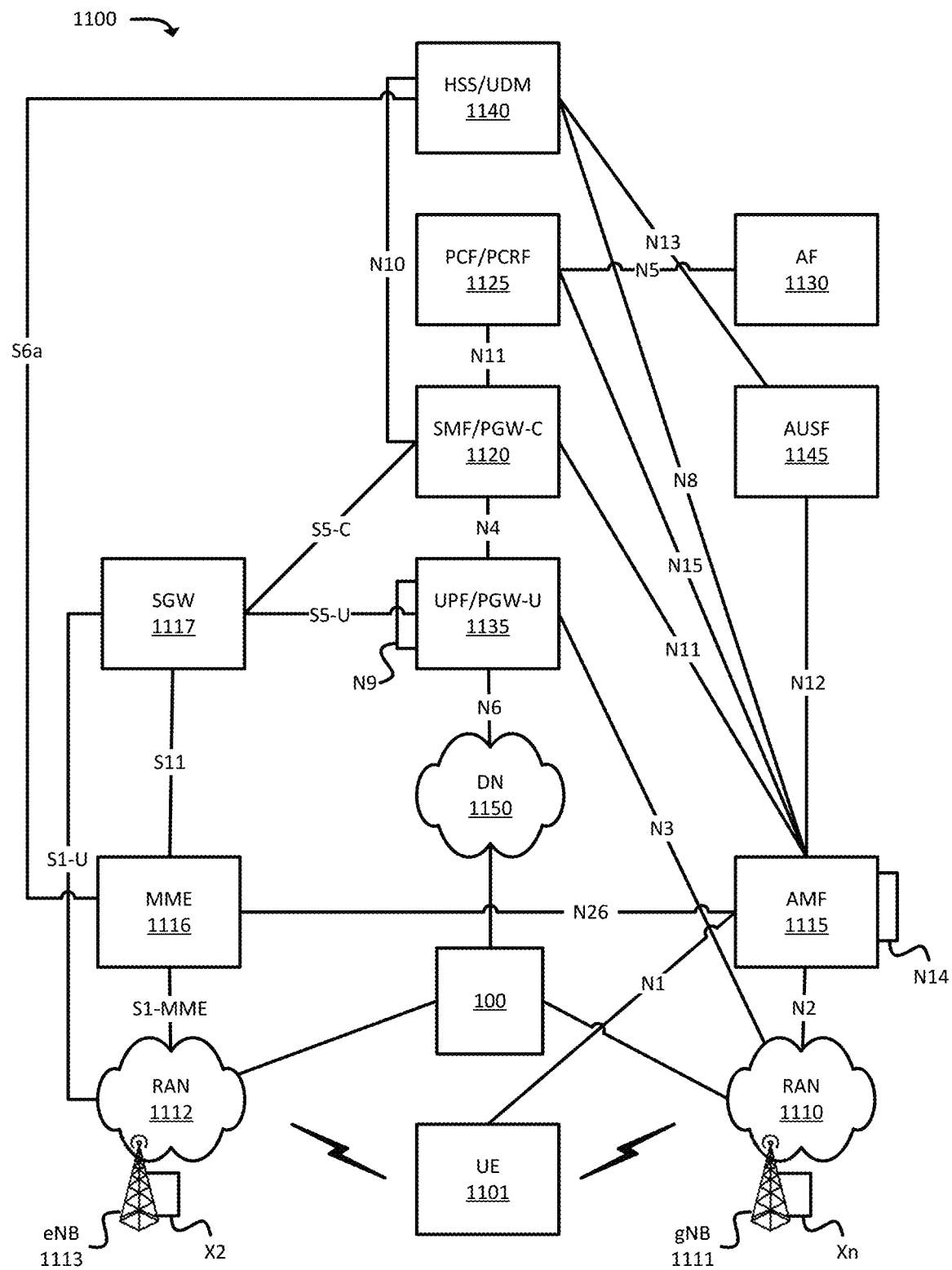
FIG. 11 illustrates an example environment, in which one or more embodiments may be implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1100 may include UE 1101, RAN 1110 (which may include one or more Next Generation Node Bs ("gNBs") 1111), RAN 1112 (which may include one or more one or more evolved Node Bs ("eNBs") 1113), and various network functions such as Access and Mobility Management Function ("AMF") 1115, Mobility Management Entity ("MME") 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Home Subscriber Server ("HSS")/Unified Data Management ("UDM") 1140, and Authentication Server Function ("AUSF") 1145. Environment 1100 may also include one or more networks, such as Data Network ("DN") 1150. Environment 1100 may include one or more additional devices or systems communicatively coupled to one or more networks (e.g., DN 1150), such as conference monitoring system 100.

The example shown in FIG. 11 illustrates one instance of each network component or function (e.g., one instance of SMF/PGW-C 1120, PCF/PCRF 1125, UPF/PGW-U 1135, HSS/UDM 1140, and/or 1145). In practice, environment 1100 may include multiple instances of such components or functions. For example, in some embodiments, environment 1100 may include multiple "slices" of a core network, where each slice includes a discrete set of network functions (e.g., one slice may include a first instance of SMF/PGW-C 1120, PCF/PCRF 1125, UPF/PGW-U 1135, HSS/UDM 1140, and/or 1145, while another slice may include a second instance of SMF/PGW-C 1120, PCF/PCRF 1125, UPF/PGW-U 1135, HSS/UDM 1140, and/or 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, front-end interfaces, etc. Alternatively, or additionally, one or more of the devices of environment 1100 may perform one or more network functions described as being performed by another one or more of the devices of environment 1100. Devices of environment 1100 may interconnect with each other and/or other devices via wired connections, wireless connections, or a combination of wired and wireless connections. In some implementations, one or more devices of environment 1100 may be physically integrated in, and/or may be physically attached to, one or more other devices of environment 1100. For example, environment 1100 may include conference monitoring system 100, which may perform one or more operations described above.

UE 1101 may include a computation and communication device, such as a wireless mobile communication device that is capable of communicating with RAN 1110, RAN 1112, and/or DN 1150. UE 1101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 1101 may send traffic to and/or receive traffic (e.g., user plane traffic) from DN 1150 via RAN 1110, RAN 1112, and/or UPF/PGW-U 1135. In some embodiments, UE 1101 may include the devices that request different content, items, content types, or item types from a content or item platform within DN 1150.

RAN 1110 may be, or may include, a 5G RAN that includes one or more base stations (e.g., one or more gNBs 1111), via which UE 1101 may communicate with one or more other elements of environment 1100. UE 1101 may communicate with RAN 1110 via an air interface (e.g., as provided by gNB 1111). For instance, RAN 1110 may receive traffic (e.g., voice call traffic, data traffic, messaging traffic, signaling traffic, etc.) from UE 1101 via the air interface, and may communicate the traffic to UPF/PGW-U 1135, and/or one or more other devices or networks. Similarly, RAN 1110 may receive traffic intended for UE 1101 (e.g., from UPF/PGW-U 1135, AMF 1115, and/or one or more other devices or networks) and may communicate the traffic to UE 1101 via the air interface.

RAN 1112 may be, or may include, a LTE RAN that includes one or more base stations (e.g., one or more eNBs 1113), via which UE 1101 may communicate with one or more other elements of environment 1100. UE 1101 may communicate with RAN 1112 via an air interface (e.g., as provided by eNB 1113). For instance, RAN 1110 may receive traffic (e.g., voice call traffic, data traffic, messaging traffic, signaling traffic, etc.) from UE 1101 via the air interface, and may communicate the traffic to UPF/PGW-U 1135, and/or one or more other devices or networks. Similarly, RAN 1110 may receive traffic intended for UE 1101 (e.g., from UPF/PGW-U 1135, SGW 1117, and/or one or more other devices or networks) and may communicate the traffic to UE 1101 via the air interface.

AMF 1115 may include one or more devices, systems, Virtualized Network Functions ("VNFs"), etc., that perform operations to register UE 1101 with the 5G network, to establish bearer channels associated with a session with UE 1101, to hand off UE 1101 from the 5G network to another network, to hand off UE 1101 from the other network to the 5G network, manage mobility of UE 1101 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, etc., that perform operations to register UE 1101 with the EPC, to establish bearer channels associated with a session with UE 1101, to hand off UE 1101 from the EPC to another network, to hand off UE 1101 from another network to the EPC, manage mobility of UE 1101 between RANs 1112 and/or eNBs 1113, and/or to perform other operations.

SGW 1117 may include one or more devices, systems, VNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, etc., that gather, process, store, and/or provide information in a manner described herein. SMF/PGW-C 1120 may, for example, facilitate the establishment of communication sessions on behalf of UE 1101. In some embodiments, the establishment of communications sessions may be performed in accordance with one or more policies provided by PCF/PCRF 1125.

PCF/PCRF 1125 may include one or more devices, systems, VNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, etc., that receive, store, and/or provide information that may be used in determining parameters (e.g., quality of service parameters, charging parameters, or the like) for certain applications.

UPF/PGW-U 1135 may include one or more devices, systems, VNFs, etc., that receive, store, and/or provide data (e.g., user plane data). For example, UPF/PGW-U 1135 may receive user plane data (e.g., voice call traffic, data traffic, etc.), destined for UE 1101, from DN 1150, and may forward the user plane data toward UE 1101 (e.g., via RAN 1110, SMF/PGW-C 1120, and/or one or more other devices). In some embodiments, multiple UPFs 1135 may be deployed (e.g., in different geographical locations), and the delivery of content to UE 1101 may be coordinated via the N8 interface (e.g., as denoted in FIG. 11 by the line marked "N9" originating and terminating at UPF/PGW-U 1135). Similarly, UPF/PGW-U 1135 may receive traffic from UE 1101 (e.g., via RAN 1110, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

HSS/UDM 1140 and AUSF 1145 may include one or more devices, systems, VNFs, etc., that manage, update, and/or store, in one or more memory devices associated with AUSF 1145 and/or HSS/UDM 1140, profile information associated with a subscriber. AUSF 1145 and/or HSS/UDM 1140 may perform authentication, authorization, and/or accounting operations associated with the subscriber and/or a communication session with UE 1101.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 1101 may communicate, through DN 1150, with data servers, other UEs 1101, and/or to other servers or applications that are coupled to DN 1150. For instance, UEs 1101 may issue requests for different content or items from one or more platforms located within DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 1101 may communicate.

Conference monitoring system 100 may interface with one or more conferencing providers in DN 1150 in order to perform classify the conferences hosted by the conferencing providers. In some embodiments, conference monitoring system 100 may be located at the network edge or at different Multi-Access/Mobile Edge Computing ("MEC") sites of the network.

Figure 12:
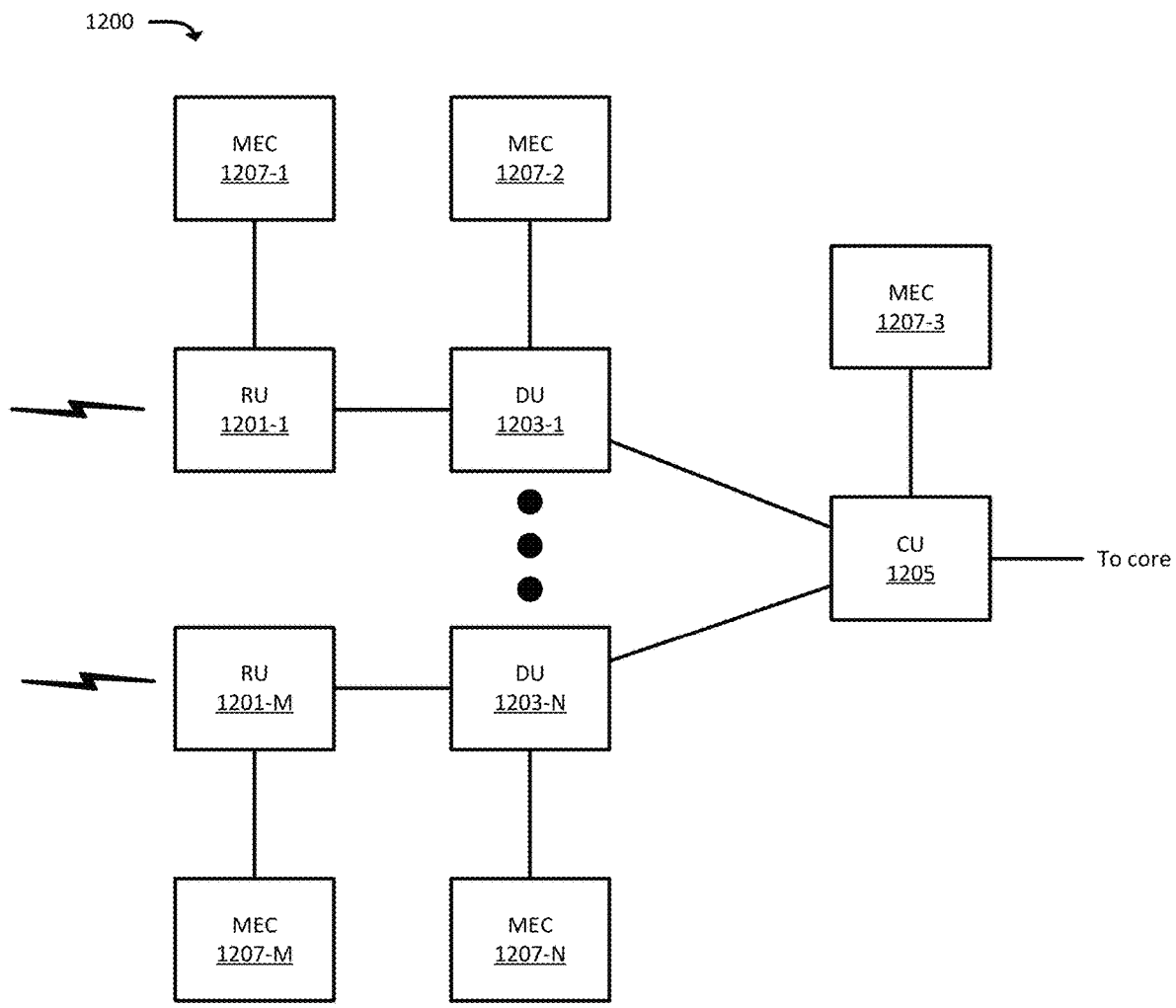
FIG. 12 illustrates an example arrangement of a Radio Access Network ("RAN"), in accordance with some embodiments.

FIG. 12 illustrates an example Distributed Unit ("DU") network 1200, which may be included in and/or implemented by one or more RANs (e.g., RAN 1110, RAN 1112, or some other RAN). In some embodiments, a particular RAN may include one DU network 1200. In some embodiments, a particular RAN may include multiple DU networks 1200. In some embodiments, DU network 1200 may correspond to a particular gNB 1111 of a 5G RAN (e.g., RAN 1110). In some embodiments, DU network 1200 may correspond to multiple gNBs 1111. In some embodiments, DU network 1200 may correspond to one or more other types of base stations of one or more other types of RANs. As shown, DU network 1200 may include Central Unit ("CU") 1205, one or more Distributed Units ("DUs") 1203-1 through 1203-N (referred to individually as "DU 1203," or collectively as "DUs 1203"), and one or more Radio Units ("Rus") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 1101 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 1101, and may determine which DU(s) 1203 should receive the downlink traffic. DU 1203 may include one or more devices that transmit traffic between a core network (e.g., via CU 1205) and UE 1101 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 1101.

RU 1201 may include hardware circuitry (e.g., one or more RF transceivers, antennas, radios, and/or other suitable hardware) to communicate wirelessly (e.g., via an RF interface) with one or more UEs 1101, one or more other DUs 1203 (e.g., via RUs 1201 associated with DUs 1203), and/or any other suitable type of device. In the uplink direction, RU 1201 may receive traffic from UE 1101 and/or another DU 1203 via the RF interface and may provide the traffic to DU 1203. In the downlink direction, RU 1201 may receive traffic from DU 1203, and may provide the traffic to UE 1101 and/or another DU 1203.

RUs 1201 may, in some embodiments, be communicatively coupled to one or more MEC devices or sites, referred to sometimes herein simply as "MECs" 1207. For example, RU 1201-1 may be communicatively coupled to MEC 1207-1, RU 1201-M may be communicatively coupled to MEC 1207-M, DU 1203-1 may be communicatively coupled to MEC 1207-2, DU 1203-N may be communicatively coupled to MEC 1207-N, CU 1205 may be communicatively coupled to MEC 1207-3, and so on. MECs 1207 may include hardware resources (e.g., configurable or provisionable hardware resources) that may be configured to provide services and/or otherwise process traffic to and/or from UE 1101, via a respective RU 1201.

For example, RU 1201-1 may route some traffic, from UE 1101, to MEC 1207-1 instead of to a core network (e.g., via DU 1203 and CU 1205). MEC 1207-1 may process the traffic, perform one or more computations based on the received traffic, and may provide traffic to UE 1101 via RU 1201-1. In this manner, ultra-low latency services may be provided to UE 1101, as traffic does not need to traverse DU 1203, CU 1205, and an intervening backhaul network between DU network 1200 and the core network. In some embodiments, MEC 1207 may include, and/or may implement, some or all of the functionality described above with respect to conference monitoring system 100.

Figure 13:
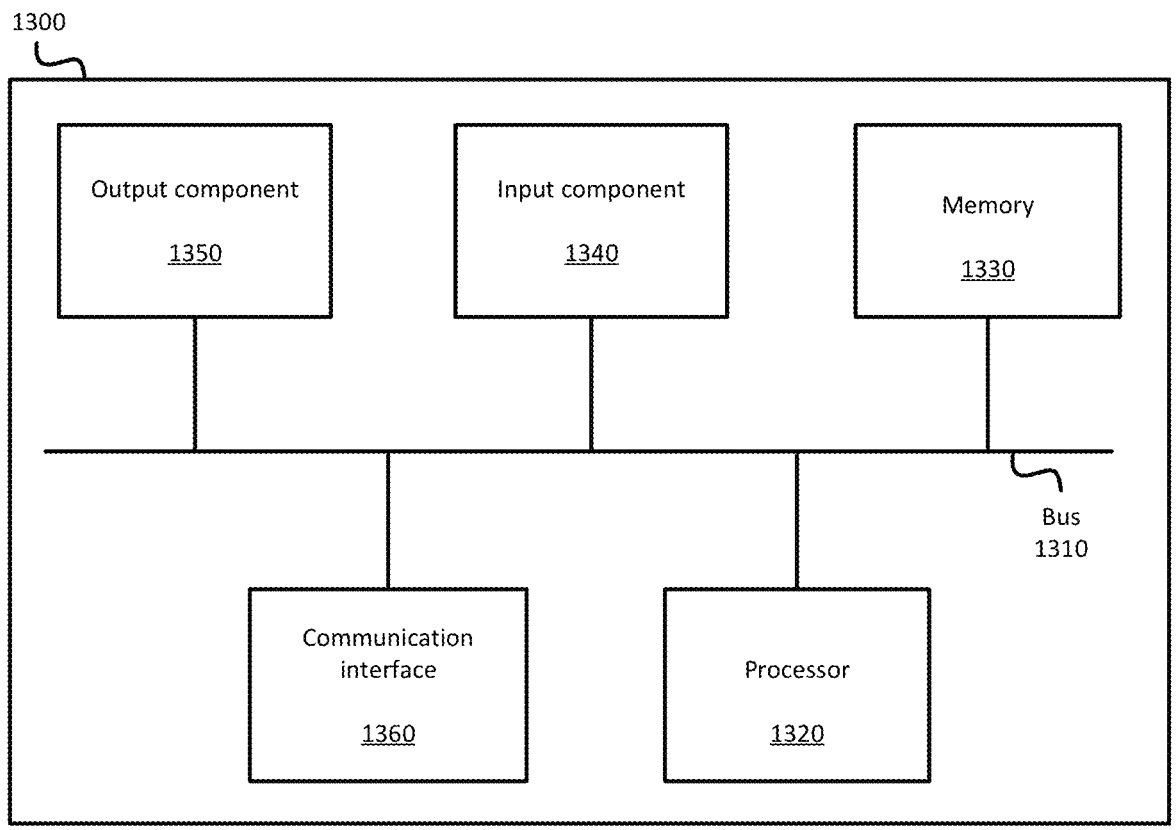
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
    one or more processors configured to:
        identify a plurality of parameters associated with a conference between a set of User Equipment ("UEs");
        compare the identified plurality of parameters to sets of parameters associated with a model that associates a plurality of classifications with respective combinations of parameters;
        identify, based on the comparing, a particular classification, of the plurality of classifications included in the model, for the conference;
        calculate an impact of each parameter, of the plurality of parameters, on the particular classification based on a particular parameter combination included in the model for the particular classification, wherein said calculating comprises determining that a subset of the plurality of parameters has a larger impact on the particular classification than other parameters of the plurality of parameters;
        select one or more actions from a plurality of actions that are associated with the particular classification and the subset of parameters; and
        perform the one or more actions.

2. The device of claim 1, wherein performing the one or more actions comprises:
    changing a setting by which one or more of the set of UEs access the conference or a different conference.

3. The device of claim 2, wherein changing the setting comprises:
    disabling a video stream of the conference for a particular UE of the set of UEs in response to the particular classification being associated with a negative experience and the subset of parameters being associated with the particular UE.

4. The device of claim 1, wherein the one or more processors are further configured to:
    determine that the subset of parameters is linked to a particular issue that resolved via the one or more actions.

5. The device of claim 1, wherein the one or more processors are further configured to:
    determine a first classification for an experience of a first UE of the set of UEs based on output provided by the model for a first set of the plurality of parameters that is associated with the first UE; and
    determine a different second classification for an experience of a second UE of the set of UEs based on output provided by the model for a second set of the plurality of parameters that is associated with the second UE, and wherein at least one of the first classification and the second classification is different than the particular classification.

6. The device of claim 5, wherein selecting the one or more actions comprises:
    determining that the first classification is associated with a negative experience, and the second classification is associated with a positive experience; and
    configuring the one or more actions to modify the experience of the first UE without modifying the experience of the second UE.

7. The device of claim 1, wherein performing the one or more actions comprises:
    generating a user interface ("UI") comprising the particular classification for the conference and classifications for one or more other conferences.

8. The device of claim 1, wherein performing the one or more actions comprises:
    generating a UI that identifies the impact of each parameter from the subset of parameters on the particular classification.

9. The device of claim 1, wherein calculating the impact of each parameter comprises:
    identifying an anomalous value for each parameter from the subset of parameters; and
    quantifying the impact for each parameter from the subset of parameters based on amount by which the anomalous value deviates from a threshold.

10. The device of claim 1, wherein the one or more processors are further configured to:
    train the model using parameters of a different set of conferences and classification labels that are associated with each conference of the different set of conferences.

11. A non-transitory computer-readable medium, storing a plurality of processor-executable instructions to:
    identify a plurality of parameters associated with a conference between a set of User Equipment ("UEs");
    compare the identified plurality of parameters to sets of parameters associated with a model that associates a plurality of classifications with respective combinations of parameters;

identify, based on the comparing, a particular classification, of the plurality of classifications included in the model, for the conference;

calculate an impact of each parameter, of the plurality of parameters, on the particular classification based on a particular parameter combination included in the model for the particular classification, wherein said calculating comprises determining that a sub set of the plurality of parameters has a larger impact on the particular classification than other parameters of the plurality of parameters;

select one or more actions from a plurality of actions that are associated with the particular classification and the subset of parameters; and perform the one or more actions.

12. The non-transitory computer-readable medium of claim 11, wherein performing the one or more actions comprises:

changing a setting by which one or more of the set of UEs access the conference or a different conference.

13. The non-transitory computer-readable medium of claim 12, wherein changing the setting comprises:

disabling a video stream of the conference for a particular UE of the set of UEs in response to the particular classification being associated with a negative experience and the subset of parameters being associated with the particular UE.

14. The non-transitory computer-readable medium of claim 11, wherein the plurality of processor-executable instructions further comprise instructions to:

determine that the subset of parameters is linked to a particular issue that resolved via the one or more actions.

15. A method, comprising:

identifying a plurality of parameters associated with a conference between a set of User Equipment ("UEs");

comparing the identified plurality of parameters to sets of parameters associated with a model that associates a plurality of classifications with respective combinations of parameters;

identifying, based on the comparing, a particular classification, of the plurality of classifications included in the model, for the conference;

calculating an impact of each parameter, of the plurality of parameters, on the particular classification based on a particular parameter combination included in the model for the particular classification, wherein said calculating comprises determining that a sub set of the plurality of parameters has a larger impact on the particular classification than other parameters of the plurality of parameters;

selecting one or more actions from a plurality of actions that are associated with the particular classification and the subset of parameters; and performing the one or more actions.

16. The method of claim 15, further comprising:

determining a first classification for an experience of a first UE of the set of UEs based on output provided by the model for a first set of the plurality of parameters that is associated with the first UE; and determining a different second classification for an experience of a second UE of the set of UEs based on output provided by the model for a second set of the plurality of parameters that is associated with the second UE, and wherein at least one of the first classification and the second classification is different than the particular classification.

17. The method of claim 16, wherein selecting the one or more actions comprises:

determining that the first classification is associated with a negative experience, and the second classification is associated with a positive experience; and configuring the one or more actions to modify the experience of the first UE without modifying the experience of the second UE.

18. The method of claim 15, further comprising:

generating a user interface ("UP") comprising the particular classification for the conference and classifications for one or more other conferences.

19. The method of claim 15, wherein calculating the impact of each parameter comprises:

identifying an anomalous value for each parameter from the subset of parameters; and quantifying the impact for each parameter from the subset of parameters based on amount by which the anomalous value deviates from a threshold.

20. The method of claim 15, further comprising:

training the model using parameters of a different set of conferences and classification labels that are associated with each conference of the different set of conferences.

* * * * *